United States Patent
Kottel et al.

(10) Patent No.: US 10,778,910 B2
(45) Date of Patent: Sep. 15, 2020

(54) SYSTEM AND METHODS FOR CORRECTING OVERLAPPING DIGITAL IMAGES OF A PANORAMA

(71) Applicant: HumanEyes Technologies Ltd., Neve Ilan (IL)

(72) Inventors: Ilya Kottel, Bat-Yam (IL); David Sajman, Givat Zeev (IL); Anton Bar, Jerusalem (IL)

(73) Assignee: HumanEyes Technologies Ltd., Neve Ilan (IL)

( * ) Notice: Subject to any disclaimer, the term of this patent is extended or adjusted under 35 U.S.C. 154(b) by 317 days.

(21) Appl. No.: 15/465,662

(22) Filed: Mar. 22, 2017

(65) Prior Publication Data
US 2018/0278854 A1 Sep. 27, 2018

(51) Int. Cl.
*H04N 13/243* (2018.01)
*H04N 5/265* (2006.01)
(Continued)

(52) U.S. Cl.
CPC ........... *H04N 5/265* (2013.01); *G06T 3/4038* (2013.01); *G06T 5/002* (2013.01); *G06T 5/008* (2013.01);
(Continued)

(58) Field of Classification Search
CPC .......... G06T 2207/10021; G06T 5/002; H04N 5/23238; H04N 5/265
See application file for complete search history.

(56) References Cited

U.S. PATENT DOCUMENTS

| 7,724,286 B2* | 5/2010 | Shioya | H04N 5/232 348/218.1 |
| 2003/0117488 A1* | 6/2003 | Pierce | H04N 5/23238 348/48 |

(Continued)

FOREIGN PATENT DOCUMENTS

WO WO 2018/173064 9/2018

OTHER PUBLICATIONS

International Search Report and the Written Opinion dated Aug. 9, 2018 From the International Searching Authority Re. Application No. PCT/IL2018/050334. (16 Pages).

(Continued)

*Primary Examiner* — Md N Haque

(57) ABSTRACT

There is provided a method of processing digital images, comprising: selecting a reference digital image according to a uniform distribution requirement of pixel intensity values, performing for each certain overlapping image that overlaps with at least one other image at a respective overlapping region: computing a value for each respective gamma parameter for each channel of the certain overlapping image to obtain a correlation between pixel intensity values, corrected with the respective gamma parameters, of each channel of each overlapping region of the certain overlapping image, and pixel intensity values, corrected with respective gamma parameters, computed for each of the at least one other image, for each channel of each respective overlapping region, and creating corrected images by applying the computed value of each respective gamma parameter to the overlapping and non-overlapping regions of each certain overlapping image of the plurality of overlapping images.

20 Claims, 6 Drawing Sheets

(51) Int. Cl.
G06T 3/40 (2006.01)
G06T 5/00 (2006.01)
H04N 5/225 (2006.01)
H04N 5/232 (2006.01)

(52) U.S. Cl.
CPC ....... H04N 5/2258 (2013.01); H04N 5/23238 (2013.01); H04N 13/243 (2018.05); *G06T 2207/10016* (2013.01); *G06T 2207/10021* (2013.01); *G06T 2207/10024* (2013.01)

(56) References Cited

U.S. PATENT DOCUMENTS

| | | | |
|---|---|---|---|
| 2006/0115182 A1* | 6/2006 | Deng | G06T 5/009 382/284 |
| 2006/0208960 A1* | 9/2006 | Glen | G09G 5/395 345/3.1 |
| 2007/0019946 A1* | 1/2007 | Clemens | G03B 17/00 396/322 |
| 2007/0041656 A1* | 2/2007 | Clarke | G06T 3/4038 382/274 |
| 2009/0086046 A1* | 4/2009 | Reilly | H04N 5/2353 348/222.1 |
| 2015/0055886 A1 | 2/2015 | Oh et al. | |
| 2017/0352138 A1 | 12/2017 | Wang | |

OTHER PUBLICATIONS

International Preliminary Report on Patentability dated Oct. 3, 2019 From the International Bureau of WIPO Re. Application No. PCT/IL2018/050334. (9 Pages).

\* cited by examiner

SYSTEM AND METHODS FOR CORRECTING OVERLAPPING DIGITAL IMAGES OF A PANORAMA

BACKGROUND OF THE INVENTION

The present invention, in some embodiments thereof, relates to panoramic images and, more specifically, but not exclusively, to systems and methods for processing digital images for creation of a panoramic image.

A panoramic image is an image that has visual information for angles around a viewer. Pixels of a color digital panoramic image define color and intensity for azimuthal angles and polar angles in a spherical coordinate system that defines the panoramic image.

360×180 panoramic images capture a 360-degree viewing space around the viewer, and 180 degrees above the viewer including top/zenith to bottom/nadir. The panoramic image captures the view of a person that can turn their head in any direction and angle, and see something.

SUMMARY OF THE INVENTION

According to a first aspect, a computer implemented method of processing digital images for creation of a digital panoramic image, comprising: receiving a plurality of overlapping digital images captured for creating a digital panoramic image, selecting a reference digital image according to a uniform distribution requirement of pixel intensity values, wherein gamma parameters of the channels of the reference digital image are set to a baseline value, performing for each certain overlapping image of the plurality of overlapping images that overlaps with at least one other image at a respective overlapping region: computing a value for each respective gamma parameter for each channel of the certain overlapping image to obtain a correlation between pixel intensity values, corrected with the respective gamma parameters, of each channel of each overlapping region of the certain overlapping image, and pixel intensity values, corrected with respective gamma parameters, computed for each of the at least one other image, for each channel of each respective overlapping region, and creating corrected images by applying the computed value of each respective gamma parameter to the overlapping and non-overlapping regions of each certain overlapping image of the plurality of overlapping images.

According to a second aspect, a system for processing digital images for creation of a digital panoramic image, comprising: a non-transitory memory having stored thereon a code for execution by at least one hardware processor of a computing device, the code comprising: code for receiving a plurality of overlapping digital images captured for creating a digital panoramic image, code for selecting a reference digital image according to a uniform distribution requirement of pixel intensity values, wherein gamma parameters of the channels of the reference digital image are set to a baseline value, code for performing for each certain overlapping image of the plurality of overlapping images that overlaps with at least one other image at a respective overlapping region: computing a value for each respective gamma parameter for each channel of the certain overlapping image to obtain a correlation between pixel intensity values, corrected with the respective gamma parameters, of each channel of each overlapping region of the certain overlapping image, and pixel intensity values, corrected with respective gamma parameters, computed for each of the at least one other image, for each channel of each respective overlapping region, and code for creating corrected images by applying the computed value of each respective gamma parameter to the overlapping and non-overlapping regions of each certain overlapping image of the plurality of overlapping images.

According to a third aspect, a computer program product for processing digital images for creation of a digital panoramic image, comprising: a non-transitory memory having stored thereon a code for execution by at least one hardware processor of a computing device, the code comprising: instructions for receiving a plurality of overlapping digital images captured for creating a digital panoramic image, instructions for selecting a reference digital image according to a uniform distribution requirement of pixel intensity values, wherein gamma parameters of the channels of the reference digital image are set to a baseline value, instructions for performing for each certain overlapping image of the plurality of overlapping images that overlaps with at least one other image at a respective overlapping region: computing a value for each respective gamma parameter for each channel of the certain overlapping image to obtain a correlation between pixel intensity values, corrected with the respective gamma parameters, of each channel of each overlapping region of the certain overlapping image, and pixel intensity values, corrected with respective gamma parameters, computed for each of the at least one other image, for each channel of each respective overlapping region, and instructions for creating corrected images by applying the computed value of each respective gamma parameter to the overlapping and non-overlapping regions of each certain overlapping image of the plurality of overlapping images.

The systems and/or methods and/or code instructions stored in a storage device executed by one or more processors described here provide a technical solution to the technical problem of correcting digital images with significant (e.g., visually apparent) over-exposed and/or under-exposed regions, where the digital images are stitched to create a digital panoramic image. Individual images which capture different angles of a scene, are captured by the same camera or different cameras have different exposure and/or white balance settings. The regions of over-exposure and/or under-exposure of the individual images prevent a uniform correction of the color intensities. A panoramic image formed by stitching the individual images appears unnatural and/or includes abnormal features, such as sharp borders.

The technical problem may relate to correcting overlapping images, where one or more of the overlapping images overlap with two or more other images. For example, in a 360 degree panorama, every image overlaps with two other images. In another example, in a 180×360 panorama, one or more images overlap with four other images. Visually significant differences in the colors of the images (e.g., due to over-exposure and/or under-exposure) may occur, for example, due to varying brightness effects of the sun as images are captured around a central point.

The technical problem may relate to differences in colors between different views (e.g., stereo views for left and right eyes) resulting from different rendering options applied to the same azimuthal and polar angles of the individual images that are stitched together to create the panoramic images for the different views.

The systems and/or methods and/or code instructions stored in a storage device executed by one or more processors described here improve performance of a computing device that processes individual digital images to create an improved and/or higher quality panoramic image. The computing device corrects colors of the individual digital images, to create processed images with smoothed differences of colors between the images resulting from different exposure and/or white balance settings. The higher quality panoramic image is created by improved quality of the stitching which may be seamless. The computing device processes the individual images to account for significant differences in exposure settings and/or white balance between individual images with significant regions of underexposure and/or over-exposure, which produces improved higher quality panoramic images, for example, preventing or reducing an abnormal non-uniform appearance in the panoramic image. The computing device processes individual images to create improved higher quality spherical and/or multi-view panoramic images.

In a first possible implementation form of the method according to the first or the system according to the second aspect or the computer program product according to the third aspect, the values of the respective gamma parameters for each channel of each certain overlapping image of the plurality of overlapping images are computed simultaneously.

In a second possible implementation form of the method or the system or the computer program product according to the first or second or third aspects as such or according to any of the preceding implementation forms of the first or second or third aspects, the correlation defines a statistically significant match between an average value of the gamma corrected pixel intensity values computed for each channel of each overlapping region of the certain overlapping image and an average value of the gamma corrected pixel intensity values of each channel of each of the at least one overlapping images at respective overlapping regions.

In a third possible implementation form of the method or the system or the computer program product according to the first or second or third aspects as such or according to any of the preceding implementation forms of the first or second or third aspects, pixels of channels of the at least one overlapping region of each non-reference overlapping digital image having maximum or minimum intensity values are excluded from the computation of the values of the gamma parameter.

Pixels having minimum (e.g., 0) and maximum (e.g., 255) intensity values, which represent under-exposed and over-exposed regions, are excluded from the computation of the correcting gamma value to ignore consideration of over-exposed and under-exposed areas of the images.

In a fourth possible implementation form of the method or the system or the computer program product according to the first or second or third aspects as such or according to any of the preceding implementation forms of the first or second or third aspects, pixels of channels of the non-overlapping region of each non-reference digital image having maximum or minimum intensity values are excluded from correction using the computed value of the gamma parameter.

Pixels having minimum (e.g., 0) and maximum (e.g., 255) intensity values, which represent under-exposed and over-exposed regions, are excluded from being corrected by the gamma value, since the applied correction does not influence the over-exposed and under-exposed pixel values of the respective channel. However, applying the correction to over-exposed and/or under-exposed regions does influence the other channels. The influence on the other channels causes non-symmetric changes which may distort the colors of the over-exposed and/or under-exposed regions. The color distortion results in borders between non-overexposed and over-exposed or under-exposed areas becoming very sharp.

In a fifth possible implementation form of the method or the system or the computer program product according to the first or second or third aspects as such or according to any of the preceding implementation forms of the first or second or third aspects, the method further comprises, and/or the system and/or computer program product further comprise code instructions for: receiving a first and second set of stereoscopic pairs of overlapping images, and processing the first and second set of stereoscopic pairs of overlapping images to create the plurality of overlapping digital images by interleaving corresponding images of the first and second set of stereoscopic pairs of overlapping images.

In a sixth possible implementation form of the method or the system or the computer program product according to the first or second or third aspects as such or according to any of the preceding implementation forms of the first or second or third aspects, at least one of the plurality of digital images includes a significant region of at least one of over-exposure pixel intensity values and under-exposure pixel intensity values that create visually apparent differences between colors when the plurality of non-gamma corrected non-reference digital images and the reference digital image are stitched to create the digital panoramic image.

The systems and/or methods described herein account for the regions of over-exposure and/or under-exposure, creating an improved quality panoramic image.

In a seventh possible implementation form of the method or the system or the computer program product according to the first or second or third aspects as such or according to any of the preceding implementation forms of the first or second or third aspects, each digital image of the plurality of received digital images is captured with a different camera setting of at least one of: auto exposure and white balance.

In an eighth possible implementation form of the method or the system or the computer program product according to the first or second or third aspects as such or according to any of the preceding implementation forms of the first or second or third aspects, the uniform distribution requirement defines a certain digital image having lowest variation in distribution of pixel intensity values.

The reference image is selected as the image that has the most uniform distribution of intensity pixel values over the color channels, which may be considered as the most average image. The non-reference images are adjusted according to the average image, to smooth extremes in colors, which provides a more uniform and/or smoother appearing resulting panoramic image.

In a ninth possible implementation form of the method or the system or the computer program product according to the eighth preceding implementation forms of the first or second or third aspects, the distribution of pixel intensity values of each respective digital image is computed as a sum of differences between a frequency of each intensity value of the pixels of the respective digital image and a weighted average intensity value of the pixels of the respective digital image.

In a tenth possible implementation form of the method or the system or the computer program product according to the first or second or third aspects as such or according to any of the preceding implementation forms of the first or second or third aspects, the value of the gamma parameter computed for each channel of the reference digital image is set to the reference value of one, and the value of the gamma parameters computed for each channel of the non-reference digital images are computed based on the reference value of one set for the gamma parameters of the reference digital image.

In an eleventh possible implementation form of the method or the system or the computer program product according to the first or second or third aspects as such or according to any of the preceding implementation forms of the first or second or third aspects, the values of the gamma parameter applied to pixel intensity values of each channel of each non-reference digital image are computed according to the following relationship:

$$\sum_{i=1}^{n} \|\gamma_i * B_i - \gamma_{(i+1) \bmod n} * B_{(i+1) \bmod 8}\|$$

wherein: $\gamma_i$ denotes the value of the gamma parameter of digital image i, n denotes the number of digital images, i=x denotes the reference digital image and $\gamma_x$ is set to the value 1, $$B_i = \ln\left(\frac{\sum_p I_i(p)}{NI_i}\right),$$

$NI_i$ denotes the number of pixels in the overlap region between non-reference digital images $I_x$ and $I_{x \bmod n}$, and $I_i(p)$ denotes the intensity value of pixel p of digital image i.

In a twelfth possible implementation form of the method or the system or the computer program product according to the preceding eleventh implementation forms of the first or second or third aspects, for color digital images with three color channels an optimal solution computed for 8 equations and 7 unknown values denoted by the relationship is computed based on a Linear Least Square method.

In a thirteenth possible implementation form of the method or the system or the computer program product according to the first or second or third aspects as such or according to any of the preceding implementation forms of the first or second or third aspects, the method further comprises, and/or the system and/or computer program product further comprise code instructions for: identifying at least one over/under exposure region of the non-overlapping region of each respective non-reference digital image according to a requirement of at least one of over-exposed and under-exposed intensity values of pixels of channels of the non-overlapping region of the respective non-reference digital image, and applying the computed value of the gamma parameter to each pixel intensity value of each channel of the over/under exposure region by a relatively greater adjustment of the value of the gamma parameter for pixel intensity values closer to the over-exposure and under-exposure values relative to pixel intensity values closer to middle-exposure values.

Simple gamma correction is ineffective in significant over-exposed and/or under-exposed regions. A function defining a smoother changer of the gamma correcting value is used.

In a fourteenth possible implementation form of the method or the system or the computer program product according to the preceding thirteenth implementation forms of the first or second or third aspects, the value of the gamma parameter is applied to each pixel intensity value of each channel of the over/under exposure region according the following relationships:

$$I_i(p) = F(i, p, \gamma)$$

$$F(i, p, \gamma) = I_i(p) - f(I_i(p) - I_i(p)^\gamma)$$

wherein: $\gamma$ denotes the value of the gamma parameter, p denotes the respective pixel being corrected, $I_i(p)$ denotes the intensity value of pixel p of digital image i, and f denotes a gamma factor that performs a smooth change of the value of the gamma parameter.

In a fifteenth possible implementation form of the method or the system or the computer program product according to the preceding fourteenth implementation forms of the first or second or third aspects, when the pixel intensity values are defined by the range [0,255], and wherein $f = -0.0000615148019992 * I_i(p)^2 + 0.0156862745098 * I_i(p)$.

The gamma factor f is defined as a parabola intersecting the x and y axes at the following three points: (0,0), (127.5, 1) and (255, 0), which smoothes changes of the computed gamma correcting value. The gamma factor f is less effective the further away the pixel intensity value is from the middle intensity values of 127.5. The gamma factor f is ineffective when the pixel intensity value is at the end limits of the range of intensity value, e.g., 0 (denoting under-exposure) or 255 (denoting overexposure). The gamma factor f is most effective when the pixel intensity value is 127.5.

In a sixteenth possible implementation form of the method or the system or the computer program product according to the preceding thirteenth implementation forms of the first or second or third aspects, the requirement defines the over/under exposure region as including at least one pixel having maximum or minimum intensity values and a neighborhood of proximal pixels having intensity values below the maximum intensity value and above the minimum intensity value.

In a seventeenth possible implementation form of the method or the system or the computer program product according to the first or second or third aspects as such or according to any of the preceding implementation forms of the first or second or third aspects, each digital image is a color digital image defined by red, green, and blue channels, wherein a respective value of the gamma parameter is computed for each red, green, and blue channel of each digital image.

In an eighteenth possible implementation form of the method or the system or the computer program product according to the first or second or third aspects as such or according to any of the preceding implementation forms of the first or second or third aspects, the method further comprises, and/or the system and/or computer program product further comprise code instructions for: stitching the plurality of corrected non-reference digital images and the reference digital image to create the digital panoramic image.

In a nineteenth possible implementation form of the method or the system or the computer program product according to the first or second or third aspects as such or according to any of the preceding implementation forms of the first or second or third aspects, the received plurality of digital images capture a 360×180 field of view, and wherein at least one of the plurality of digital images overlaps with four other digital images.

In a twentieth possible implementation form of the method or the system or the computer program product according to the first or second or third aspects as such or according to any of the preceding implementation forms of the first or second or third aspects, the reference digital image is selected from the plurality of digital images.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
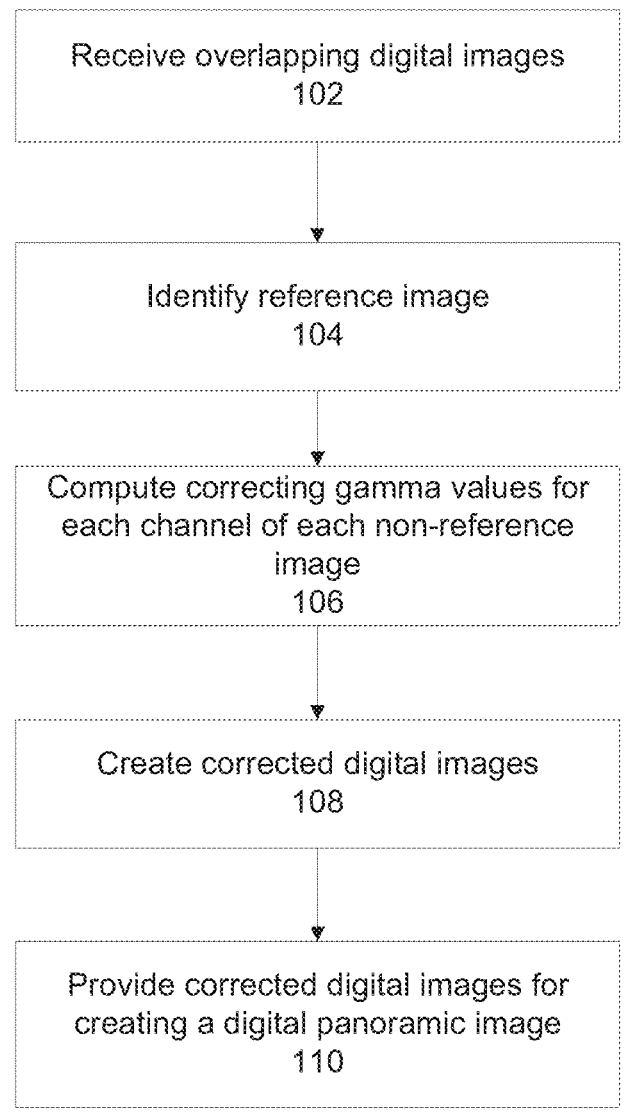
FIG. 1 is a flowchart of a method of correcting pixel intensity values of overlapping digital images based on values of gamma parameters computed according to a correlation between gamma corrected pixel intensity values of corresponding overlapping regions of overlapping images, in accordance with some embodiments of the present invention.

The present invention, in some embodiments thereof, relates to panoramic images and, more specifically, but not exclusively, to systems and methods for processing digital images for creation of a panoramic image.

An aspect of some embodiments of the present invention relates to systems and/or methods and/or code instructions stored in a storage device executed by one or more processors that correct over-lapping digital images used in creating a panoramic image.

Values for a gamma parameter are computed for each channel of each digital image according to a correlation, optionally a match (within a statistical requirement), between (optionally average values of the) gamma corrected pixel intensity values of the corresponding overlapping regions of overlapping images. The value of the gamma parameter is computed based on sets of overlapping digital images. Each digital image may overlap with one or more other digital images, for example, in a panorama of three or more images, the center image(s) overlap with two other images. In larger panorama images, the center image(s) may overlap with four other images, for example, the image take directly above the head of an observer overlaps with four images towards the four cardinal directions (north, south, east, and west). The value of the gamma parameter is computed for each certain image overlapping with one or more other images, such that gamma parameter corrected pixel intensity values of each of the overlapping regions of each of the other overlapping digital images correlate with the gamma parameter corrected pixel intensity values of the overlapping regions of the certain image. The gamma parameter is computed for each channel of each image. The computation may be performed simultaneously, to find a gamma parameter for each channel of each image overlapping with one or more other images, for example, by solving a system of equations as described herein.

The correcting gamma value of a reference digital image is set to a baseline value, optionally one. Each non-reference image is corrected according to the computed correcting gamma value. The corrected non-reference images and the reference image are provided for creation of the digital panoramic image, optionally by stitching within the overlapping regions.

The reference digital image is selected according to a uniform distribution requirement of pixel intensity values denoting the digital image with the most uniform color distribution. The other digital images are corrected according to the color distribution of the reference digital image by computing the values for the gamma parameters from the overlapping regions.

The systems and/or methods and/or code instructions stored in a storage device executed by one or more processors described here provide a technical solution to the technical problem of correcting digital images with significant (e.g., visually apparent) over-exposed and/or under-exposed regions, where the digital images are stitched to create a digital panoramic image. Individual images which capture different angles of a scene, are captured by the same camera or different cameras have different exposure and/or white balance settings. The regions of over-exposure and/or under-exposure of the individual images prevent a uniform correction of the color intensities. A panoramic image formed by stitching the individual images appears unnatural and/or includes abnormal features, such as sharp borders.

The technical problem may relate to correcting overlapping images, where one or more of the overlapping images overlap with two or more other images. For example, in a 360 degree panorama, every image overlaps with two other images. In another example, in a 180×360 panorama, one or more images overlap with four other images. Visually significant differences in the colors of the images (e.g., due to over-exposure and/or under-exposure) may occur, for example, due to varying brightness effects of the sun as images are captured around a central point.

The technical problem may relate to differences in colors between different views (e.g., stereo views for left and right eyes) resulting from different rendering options applied to the same azimuthal and polar angles of the individual images that are stitched together to create the panoramic images for the different views.

The systems and/or methods and/or code instructions stored in a storage device executed by one or more processors described here improve performance of a computing device that processes individual digital images to create an improved and/or higher quality panoramic image. The computing device corrects colors of the individual digital images, to create processed images with smoothed differences of colors between the images resulting from different exposure and/or white balance settings. The higher quality panoramic image is created by improved quality of the stitching which may be seamless. The computing device processes the individual images to account for significant differences in exposure settings and/or white balance between individual images with significant regions of under-exposure and/or over-exposure, which produces improved higher quality panoramic images, for example, preventing or reducing an abnormal non-uniform appearance in the panoramic image. The computing device processes individual images to create improved higher quality spherical and/or multi-view panoramic images.

The systems and/or methods and/or code instructions stored in a storage device executed by one or more processors described here improve an underlying process within the technical field of image processing, in particular, within the field of processing individual images to improve the quality of the panoramic image created from stitching of the individual images. The systems and/or methods and/or code instructions stored in a storage device executed by one or more processors described here do not simply describe the computation of values for gamma parameters using a mathematical operation and receiving and storing data, but combine the acts of selecting a reference image according to a uniform distribution requirement, computing the values for gamma parameters for each channel of each non-reference image according to a correlation between the gamma corrected pixel intensity values of corresponding overlapping regions of each overlapping image, and creating the corrected digital images by applying the computed values of the gamma parameter to each channel of each non-reference digital image. By this, the systems and/or methods (e.g., code instructions stored in a storage device executed by one or more processors) described here go beyond the mere concept of simply retrieving and combining data using a computer.

The systems and/or methods and/or code instructions stored in a storage device executed by one or more processors described herein are tied to physical real-life components, including one of more of: a digital camera that captures digital images that are stitched to create the panoramic image, a data storage device storing the captured digital image, the processed digital images, and/or the created panoramic image, a display that presents the created panoramic image, and a hardware processor that executes code instructions to process the digital images.

The systems and/or methods and/or code instructions stored in a storage device executed by one or more processors described herein create new data in the form of the processed digital images which are stitched to create a higher quality panoramic image.

Accordingly, the systems and/or methods and/or code described herein are inextricably tied to computing technology and/or physical components to overcome an actual technical problem arising in processing of digital images that are stitched to form a panoramic image.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term gamma parameter refers to the gamma correction nonlinear operation used to encode and decode pixel intensity values in images (e.g., still images and/or frames of video). The gamma parameter is denoted by relationship $V_{out}=AV_{in}^{\gamma}$ where $V_{in}$ denotes a pixel intensity value that is raised to the power $\gamma$ denoting the gamma parameter, and optionally multiplied by the constant A to obtained the corrected pixel intensity value denoted by $V_{out}$.

As used herein, the terms value of the gamma parameter and gamma value are interchangeable.

As used herein, the over-exposure pixel intensity values are denoted by the maximum value(s) of the scale defining the possible pixel intensity values. The under-exposure pixel values are denoted by the minimum value(s) of the scale defining the possible pixel intensity values. For example, for the range of possible values [0,255], the over-exposure pixel intensity value is 255. It is noted that other values close to the maximum value may be defined as over-exposure, for example, 254, 253, and other values. For example, for the range of possible values [0,255], the under-exposure pixel intensity value is 0. It is noted that other values close to the minimum value may be defined as under-exposure, for example, 1, 2, and other values.

Figure 2:
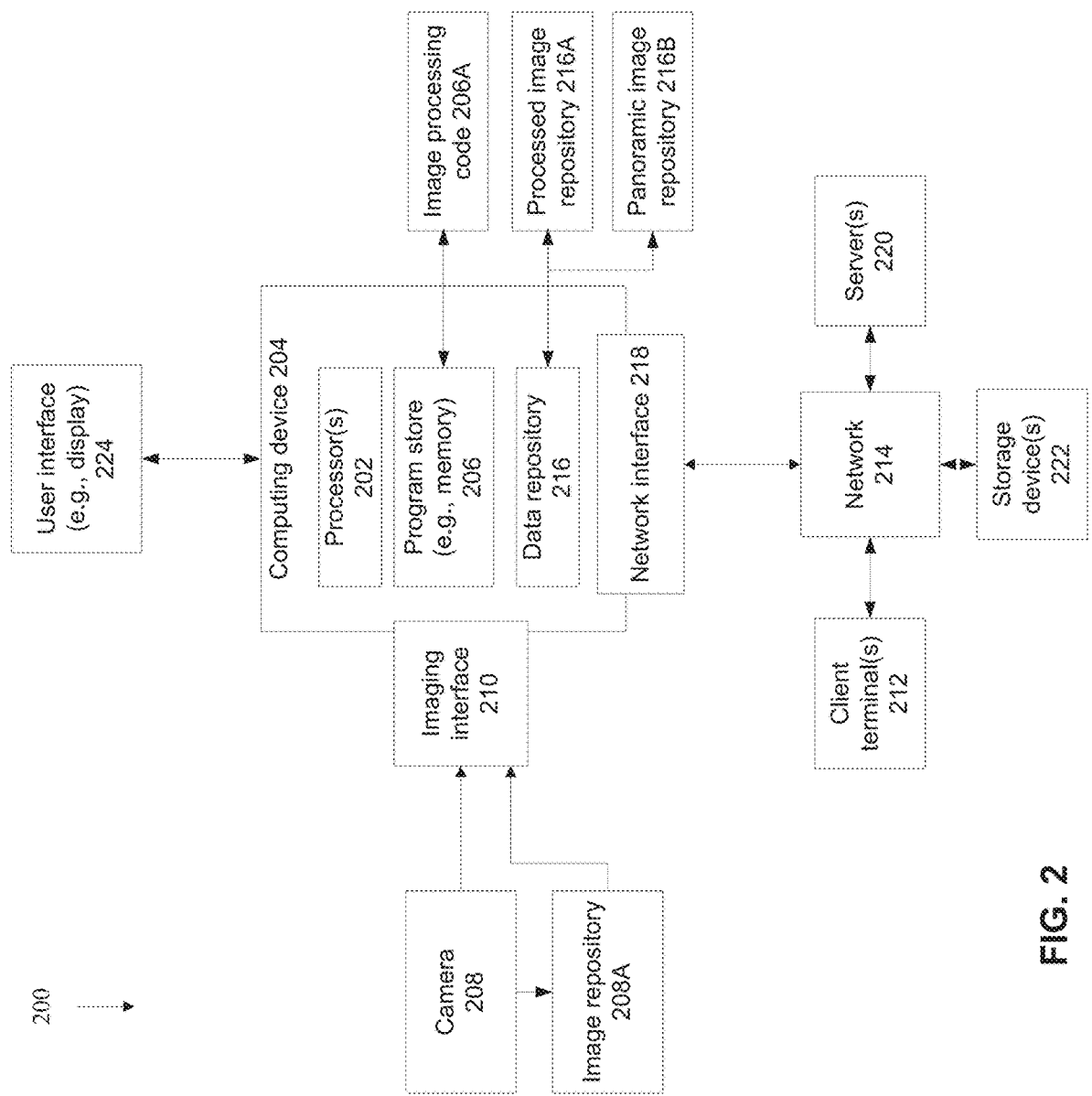
FIG. 2 is a block diagram of components of a system for receiving overlapping digital images and outputting corrected digital images by applying values of gamma parameters computed according to a correlation between gamma corrected pixel intensity values of corresponding overlapping regions of overlapping images, in accordance with some embodiments of the present invention.

Reference is now made to FIG. 1, which is a flowchart of a method of correcting pixel intensity values of overlapping digital images based on values of gamma parameters computed according to a correlation between the gamma corrected pixel intensity values of corresponding overlapping regions of overlapping images, in accordance with some embodiments of the present invention. Reference is also made to FIG. 2, which is a block diagram of components of a system 200 for receiving overlapping digital images and outputting corrected digital images by applying values of gamma parameters computed according to a correlation between gamma corrected pixel intensity values of corresponding overlapping regions of overlapping images, in accordance with some embodiments of the present invention. System 200 may implement the acts of the method described with reference to FIG. 1, by processor(s) 202 of a computing device 204 executing code instructions stored in a program store 206.

Computing device 204 receives multiple images (captured by digital camera 208) for processing. The images capture parts of a scene that is formed by stitching the images into a panoramic image. The images may capture a 360 scene, optionally a 360×180 scene, or smaller scene angles. The images may be provided by digital camera 208, and/or obtained from an image repository 208A (e.g., a memory card within camera 208, a storage server, a removable storage device associated with camera 208, and/or a computing cloud). Digital camera 208 may be implemented as a still image digital camera, and/or a video camera (in which case the images are obtained as frames of the video). Digital camera 208 may capture two dimensional digital images (2D), and/or may capture three dimensions images (3D) optionally using two or more image sensors. Digital camera 208 may capture color (e.g., red, green, blue based) images and/or in black and white images (in which case the channels described herein may refer to single channel of pixel intensity).

Computing device 204 receives the image(s) captured by camera 208 and/or stored on image repository 208A using one or more imaging interface(s) 210, for example, a wire connection, a wireless connection, other physical interface implementations, and/or virtual interfaces (e.g., software interface, application programming interface (API), software development kit (SDK)).

Computing device 204 may be implemented as, for example, a client terminal, a server, a computing cloud, a mobile device, a desktop computer, a thin client, a Smartphone, a Tablet computer, a laptop computer, a wearable computer, glasses computer, and a watch computer. Computing device 204 may include locally stored software that performs one or more of the acts described with reference to FIG. 1, and/or may act as one or more servers (e.g., network server, web server, a computing cloud) that provides services (e.g., one or more of the acts described with reference to FIG. 1) to one or more client terminals 212 over a network 214, for example, providing software as a service (SaaS) to the client terminal(s) 212, providing an application for local download to the client terminal(s) 212, and/or providing functions using a remote access session to the client terminals 212, such as through a web browser and/or application stored on a Mobile device.

Processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 204 may include one or more processors (homogenous or heterogeneous), which may be arranged for parallel processing, as clusters and/or as one or more multi core processing units.

Storage device (also known herein as a program store, e.g., a memory) 206 stores code instructions implementable by processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 206 stores image processing code 206A that execute one or more acts of the method described with reference to FIG. 1.

Computing device 204 may include a data repository 216 for storing data, for example, a processed image repository 216A that stores the outputted processed images (which are stitched to form the panoramic images) and/or a panoramic image repository 216B that stores the created panoramic image. Data repository 216 may be implemented as, for example, a memory, a local hard-drive, a removable storage unit, an optical disk, a storage device, and/or as a remote server and/or computing cloud (e.g., accessed using a network connection).

Computing device 204 may include a network interface 218 for connecting to network 214, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 204 may connect using network 214 (or another communication channel, such as through a direct link (e.g., cable, wireless) and/or indirect link (e.g., via an intermediary computing unit such as a server, and/or via a storage device) with one or more of:

Client terminal(s) 212, for example, when computing device 204 acts as a server providing SaaS and/or providing remote image processing services. The client terminals 212 may each provide the images to computing device 204 for processing over network 214. It is noted that camera 208 (and/or the storage device storing image repository 208A) may be connected to client terminal 212, providing the image using network 214. The processed images and/or the created panoramic image may be provided to client terminal(s) 212.

Remotely located server 220 that receives the processed images and stitches the processed images to create the panoramic image. Server 220 may receive the panoramic image. Server 220 may locally display the panoramic image, store the processed images and/or panoramic image, and/or transmit the processed images and/or panoramic image to another server.

Storage device 222 that stores one or more of: image repository 208A, processed image repository 216A, and/or panoramic image repository 216B.

Computing device 204 and/or client terminal(s) include and/or are in communication with a user interface 224 that includes a mechanism for a user to enter data (e.g., designate and/or upload the captured images) and/or view presented data (e.g., the processed images and/or the created panoramic image). Exemplary user interfaces 224 include, for example, one or more of, a touchscreen, a display, a keyboard, a mouse, and voice activated software using speakers and microphone.

Referring now back to FIG. 1, at 102, digital images captured for creating a digital panoramic image (e.g., captured by digital camera(s) 208 and/or stored by image repository 208A) are received by computing device 204 (e.g., using imaging interface 210).

Each digital image overlaps with one or more other digital images at an overlapping region(s). Some images overlap with two, three, four, or more other digital images, for example, images within the interior of the panoramic image.

The digital images may be captured by one or multiple cameras. Each image is captured at a different angle, to cover a wide field of view, optionally a 360 degree field of view (or a smaller angle), optionally a 360×180 field of view (or smaller angles).

Optionally, the digital images are captured by a pair of cameras arranged to capture stereoscopic images, for example, corresponding to the left eye and the right eye. There may be multiple pairs of cameras capturing images, for example, a set of cameras that capture images for the left eye, and another set of cameras that capture images for the right eye.

Two panoramic images are created, one panoramic image for the left eye from the set of camera(s) that capture images for the left eye, and another panoramic image for the right eye from the set of camera(s) that capture images for the right eye. The digital images captured for the left eye may be processed independently from the set of images captured for the right eye. Alternatively, the images of the left eye are interleaved with the images of the right eye and processed (as described herein) as a single set of interleaved images. The interleaved images are corrected based on each other (as described herein), reducing or preventing differences in colors between the resulting left panoramic image and the right eye panoramic image. The interleaved corrected images are separated into the left and right set of images. Each set of images is combined (e.g., stitched) to create the left and right panoramic images.

In terms of mathematical representation, a set of images captured by a left eye camera capturing image for the left eye is denoted as L(1), L(2), L(3), . . . L(last). The corresponding images captured by a right eye camera capturing images for the right eye is denoted as R(1), R(2), R(3), . . . R(last). The interleaved sequence of images is mathematically denoted by L(1), R(1), L(2), R(2), L(3), R(3) . . . L(last), R(last).

Figure 4:
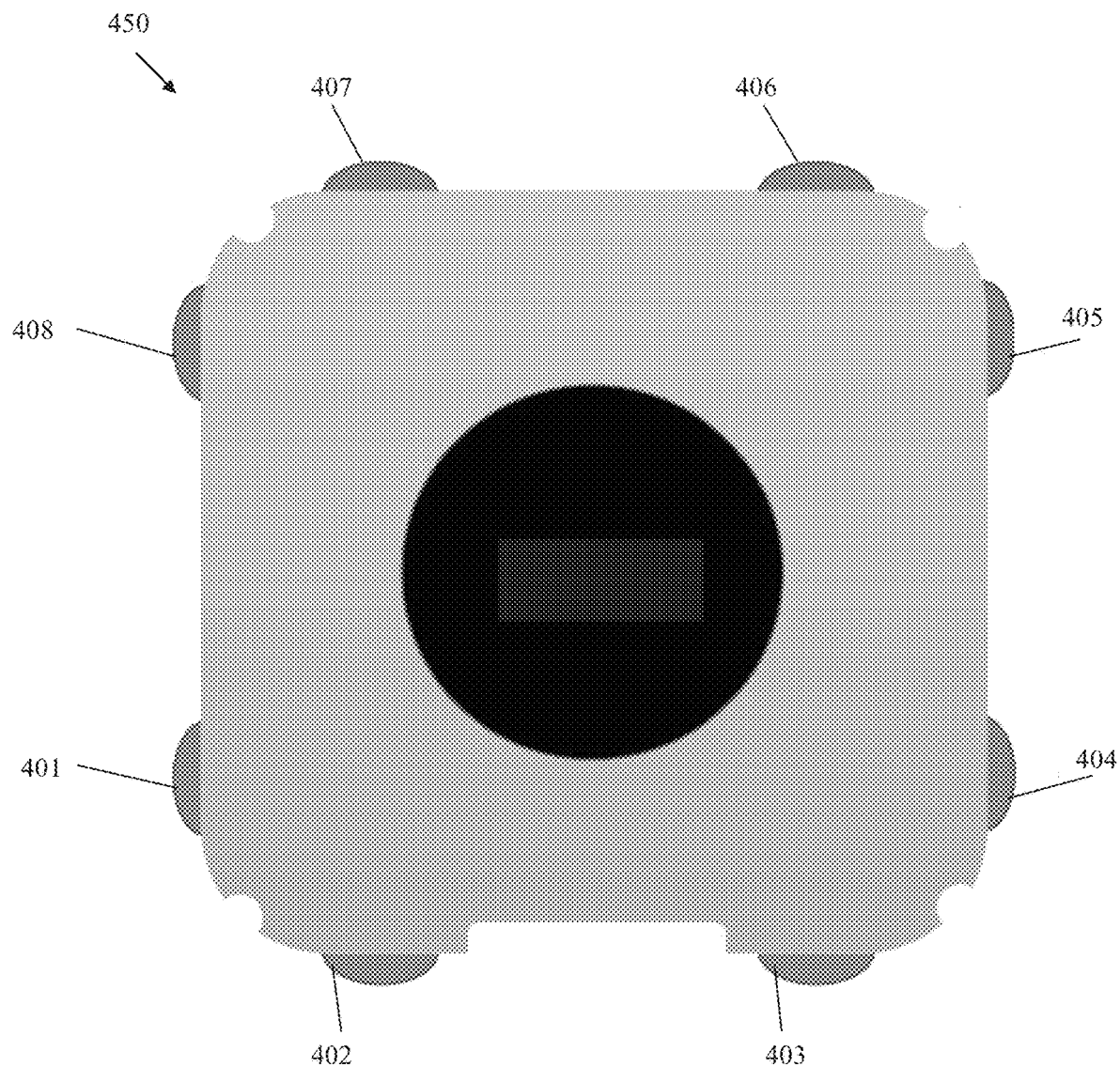
FIG. 4 is a schematic depicting a device for capturing stereoscopic images that are combined to create a left panoramic image and a right panoramic image, in accordance with some embodiments of the present invention.

Reference is now made to FIG. 4, which is a schematic depicting an exemplary device 450 for capturing stereoscopic images that are combined to create a left panoramic image and a right panoramic image, in accordance with some embodiments of the present invention. Device 450 is shaped substantially as a square, and includes a pair of cameras to capture images for the left eye and right eye at each of the four corners of the square. Cameras 401, 403, 405, and 407 each located at a respective corner of the square capture an image, which form a first set of images for one eye. Cameras 402, 404, 406, and 408, each located at a corresponding corner of the square, respectfully capture another image, which form a second set of images for the other eye. The first and second sets of images may be processed and corrected independently to create the first and second panoramic images. Alternatively, the images from the camera are interleaved to create a single set of images which are processed and corrected, for example, the images captured by respective cameras are interleaved according to the following sequence: 401, 402, 403, 404, 405, 406, 407, 408. The corrected images are then separated back out and stitched to create the left and right panoramas.

Referring now back to act 102 of FIG. 1, optionally, the digital images are color digital images defined by red, green, and blue channels. Each channel is associated with a certain pixel intensity value. Alternatively or additionally, the digital images are black and white images defined by a single channel associated with a certain pixel intensity value.

The digital images are captured with a different exposure (e.g., auto exposure) and/or white balance settings. Digital images having different exposures and/or white balance, which would otherwise result in significant differences between colors of stitched frames of the panoramic images, are corrected (as described herein) to provide an improved quality panoramic image.

One or more of the digital images include a significant region of over-exposure pixel intensity values and/or under-exposure pixel intensity values that create visually apparent differences between colors when the digital images (i.e., the non-corrected images) are stitched to create the digital panoramic image. The size of the significant over-exposure and/or under-exposure regions may vary, for example, according to the size of the images, according to the resolution of the images, according to neighboring colors, and/or according to the viewer (a viewer with average vision is assumed). The systems and/or methods described herein account for the regions of over-exposure and/or under-exposure, creating an improved quality panoramic image.

At 104, a reference digital image is selected from the received digital images. Optionally, the reference digital image is selected from the digital images that are captured for creating the digital panoramic image. Alternatively, the reference digital image is an independent image that is not necessarily used in the creation of the digital panoramic image. For example, the reference image may be captured by the same camera and/or a different camera. The reference image may be used to compute the gamma values for the digital images used for creating the panoramic image, within necessarily including the reference image itself in the panoramic image.

The reference digital image is selected according to a uniform distribution requirement of the pixel intensity values of the images. The uniform distribution requirement defines the digital image with the lowest variation in distribution of pixel intensity values. The reference image is selected as the image that has the most uniform distribution of intensity pixel values over the color channels (or single channel), which may be considered as the most average image. The non-reference images are adjusted according to the average image, to smooth extremes in colors, which provides a more uniform and/or smoother appearing resulting panoramic image Optionally, the distribution of pixel intensity values of each respective digital image is computed as a sum of differences between a frequency of each intensity value of the pixels of the respective digital image and a weighted average intensity value of the pixels of the respective digital image. The digital image with the lowest sum of the differences is selected as the image with the most uniform distribution of pixel intensity values. Other distribution functions may be used to compute the distribution of the pixel intensity values for selection of the image with the most uniform distribution of pixel intensity values.

An exemplary method for selecting the reference image is as follows: a histogram of the frequency of each pixel intensity value is computed. The histogram stores, for each possible pixel intensity value (e.g., in the range [0,255]), the number of pixels within the image that have each pixel intensity value. The histogram is computed for each channel (e.g., red, green, and blue). The average intensity value is computed as a weighted average. The reference image is selected as the image with the lowest value of the sum of the differences between the number of pixels having each pixel intensity value and the calculated weighted average intensity value.

At 106, a gamma value is computed for each channel of each non-reference digital image (e.g., for the red, green, and blue channels of color digital images). The gamma value is computed according to a correlation (optionally a match) between the gamma corrected pixel intensity values of corresponding overlapping regions of each image.

The correlation is optionally defined as a match (within a statistical requirement representing a margin of tolerance defining equality) between a function (optionally an average) of values of the gamma corrected pixel intensity values of the corresponding overlapping regions of the overlapping images.

The gamma values of each channel of the reference image are set as a baseline, optionally to the value one (1). The gamma values of each channel of the non-reference images are computed according to the values of the correcting gamma value of the reference image.

Pixels of channels of the overlapping region(s) of each non-reference digital image having pixel intensity values denoting over-exposure and/or under-exposure (e.g., maximum or minimum values) are excluded from the computation of the gamma value. The pixels are excluded when one or more of the channels have the over-exposure and/or under-exposure pixel intensity values. Pixels having minimum (e.g., 0) and maximum (e.g., 255) intensity values, which represent under-exposed and over-exposed regions, are excluded from the computation of the correcting gamma value to ignore consideration of over-exposed and under-exposed areas of the images.

The gamma values for each channel of each non-reference digital image are computed according to Equation (1):

$$\sum_{i=1}^{n} \|\gamma_i * B_i - \gamma_{(i+1) \bmod n} * B_{(i+1) \bmod n}\| \quad \text{Equation (1)}$$

Where:

n denotes the number of digital images, $\gamma_i$ denotes the gamma value of digital image i, where i=x denotes the reference digital image and $\gamma_x$ is set to the baseline value=1, $$B_i = \ln\left(\frac{\sum_p I_i(p)}{NI_i}\right),$$

$NI_i$ denotes the number of pixels in the overlap region of the overlapping digital images $I_x$ and $I_{x \bmod n}$, and $I_i(p)$ denotes the intensity value of pixel p of digital image i.

For color digital images with three color channels, an optimal solution is computed for the over determined linear system that includes 8 equations and 7 unknown values denoted by Equation (1). The optimal solution may be computed based on a Linear Least Square method, and/or other computation methods that solve overdetermined systems.

The derivation of Equation (1) is now described. Equation (1) is based on n number of images. For the simpler case of two overlapping images denoted I(i) and I(i+1 mod n), $\gamma_1$ of the first image and $\gamma_2$ of the second image are related by equation (2). Three gamma values are computed for the three color channels of each image.

$$\frac{\sum_p I_1(p)^{\gamma_1}}{N1} = \frac{\sum_p I_2(p)^{\gamma_2}}{N1} \qquad \text{Equation (2)}$$

Applying a logarithm operation to both sides of Equation (2) yields Equation (3), where $B_i$ is defined with reference to Equation (1):

$$\gamma_1 * \ln\left(\frac{\sum_p I_1(p)}{NI_1}\right) = \gamma_2 * \ln\left(\frac{\sum_p I_2(p)}{NI_2}\right) \Rightarrow \gamma_1 * B_1 = \gamma_2 * B_2$$

At 108, corrected digital images are created by applying the gamma value computed for each channel of each non-reference image. The gamma values computed for each non-reference image are applied to the pixel intensity values of each channel of the overlapping region(s) and the non-overlapping region(s) of each respective non-reference image.

Optionally, the reference image is not corrected. The reference image, which serves as a baseline, is defined as being color corrected. It is noted that when the value of the gamma parameter of the reference image is set to one (1), applying the value of one to the reference image does not result in a change of the pixel intensity values.

Pixels of channels of the non-overlapping region of each non-reference digital image having maximum or minimum intensity values are excluded from correction using the correcting gamma value. Pixels having minimum (e.g., 0) and maximum (e.g., 255) intensity values, which represent under-exposed and over-exposed regions, are excluded from being corrected by the gamma value, since the applied correction does not influence the over-exposed and under-exposed pixel values of the respective channel. However, applying the correction to over-exposed and/or under-exposed regions does influence the other channels. The influence on the other channels causes non-symmetric changes which may distort the colors of the over-exposed and/or under-exposed regions. The color distortion results in borders between non-overexposed and over-exposed or under-exposed areas becoming very sharp Significant over-exposure and/or under-exposure regions of the non-overlapping region of each digital image are identified according to a requirement. The requirement defines the significant over-exposed and/or under-exposed regions according to intensity values of pixels of channels of the non-overlapping region. The requirement may define a minimum size of the significant over-exposure and/or under-exposure regions, for example, as a percentage of the total number of pixels of the image. The requirement may be based on other methods of identifying the significant over-exposure and/or under-exposure regions, for example, based on a mathematical model that predicts visually apparent aberrations arising when the significant over-exposure and/or under-exposure regions are processed using the computed correcting gamma values.

The requirement may define the significant over-exposure and/or under-exposure regions as including a neighborhood of pixels in proximity to the over-exposure and/or under-exposure pixels, where the proximity pixels have intensity values below the maximum intensity value and/or above the minimum intensity value. The neighborhood may be defined, for example, as a percentage of number of pixels in the over and/or under exposed region, as a predefined absolute number of pixels, and/or based on a mathematical model that computes the neighborhood according to visual features of the pixels.

The pixel intensity values of the non-overlapping region of each channel of each non-reference image are corrected according to Equation (4):

$$I_i(p) = F(i,p,\gamma) \qquad \text{Equation (4)}$$

When the pixels of the non-overlapping region of the non-reference images are determined as located outside of the identified significant over-exposure and/or under-exposure regions, Equation (5) is applied:

$$F(i,p,\gamma) = I_i(p)^\gamma \qquad \text{Equation (5)}$$

When the pixels of the non-overlapping region of the non-reference images are determined as located within the identified significant over-exposure and/or under-exposure regions, the simple gamma correction based on Equation (5) is ineffective. A function defining a smoother changer of the gamma correcting value is used. The gamma value is applied to each pixel intensity value of each channel of the identified significant over-exposure and/or under-exposure regions by adjusting the gamma value for pixel intensity values closer to over-exposure and under-exposure values relative to pixel intensity values closer to middle-exposure values. The gamma value is applied to each pixel intensity value of each channel of the identified significant over-exposure and/or under-exposure regions according to Equation (6):

$$F(i,p,\gamma) = I_i(p) - f(I_i(p) - I_i(p)^\gamma) \qquad \text{Equation (6)}$$

where:
p denotes the respective pixel being corrected,
$I_i(p)$ denotes the intensity value of pixel p of digital image i,
$\gamma$ denotes the computed correcting gamma value, and
f denotes a gamma factor that performs a smooth change of the value of the computed correcting gamma value.

When the pixel intensity values are defined by the range [0,255], the gamma factor f may be defined according to Equation (7):

$$f = -0.0000615148019992 * I_i(p)^2 + 0.0156862745098 * I_i(p) \qquad \text{Equation (7)}$$

The gamma factor f is defined as a parabola intersecting the x and y axes at the following three points: (0,0), (127.5, 1) and (255, 0), which smoothes changes of the computed gamma correcting value. The gamma factor f is less effective the further away the pixel intensity value is from the middle intensity values of 127.5. The gamma factor f is ineffective when the pixel intensity value is at the end limits of the range of intensity value, e.g., 0 (denoting under-exposure) or 255 (denoting overexposure). The gamma factor f is most effective when the pixel intensity value is 127.5.

It is noted that Equation (7) is adjusted according to the defined range of possible pixel intensity values.

At 110, the corrected digital images are provided for creating a digital panoramic image. The corrected digital images may be locally stored by computing device 204 (e.g., in processed image repository 216A), transmitted back to the client terminal 212 that provided the digital images, and/or transmitted to another server 220 and/or storage device 222 for storage and/or stitching into the digital panoramic image. The corrected digital images may be presented on a display (e.g., 224) to a user.

Optionally, the corrected digital images are stitched to create the digital panoramic image. The stitching may be performed by computing device 204, and/or a remote device (e.g., client terminal 212, and/or server 220). Stitching may be performed within the overlapping regions of the images.

The created digital panoramic image may be presented on a display (e.g., 224) to a user, transmitted to client terminal 212, storage device 220, server 220, and/or other devices.

Figure 3A:
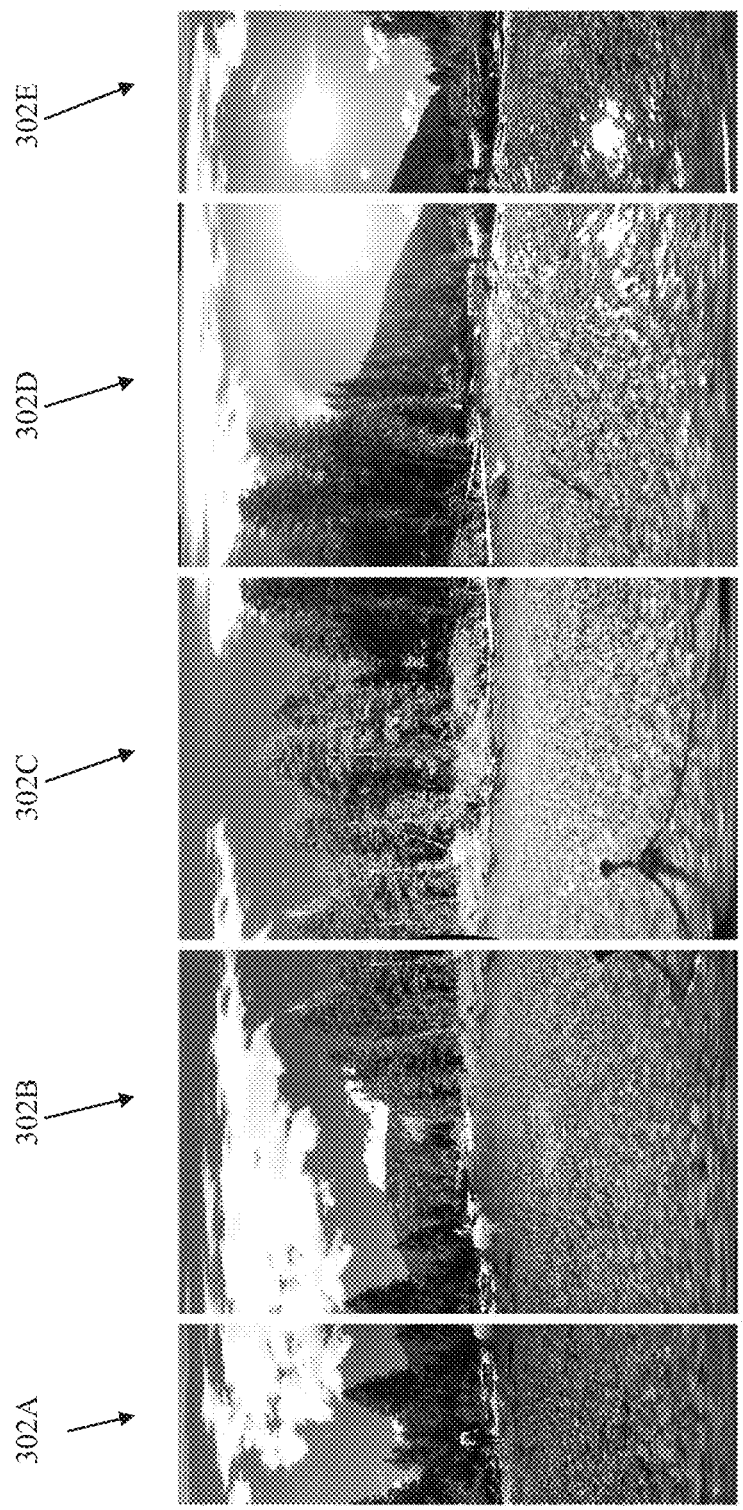
FIGS. 3A-3C are exemplary images depicting processing of correcting digital images to smooth out differences in different white balance and/or exposure settings, in accordance with some embodiments of the present invention.
Figure 3B:
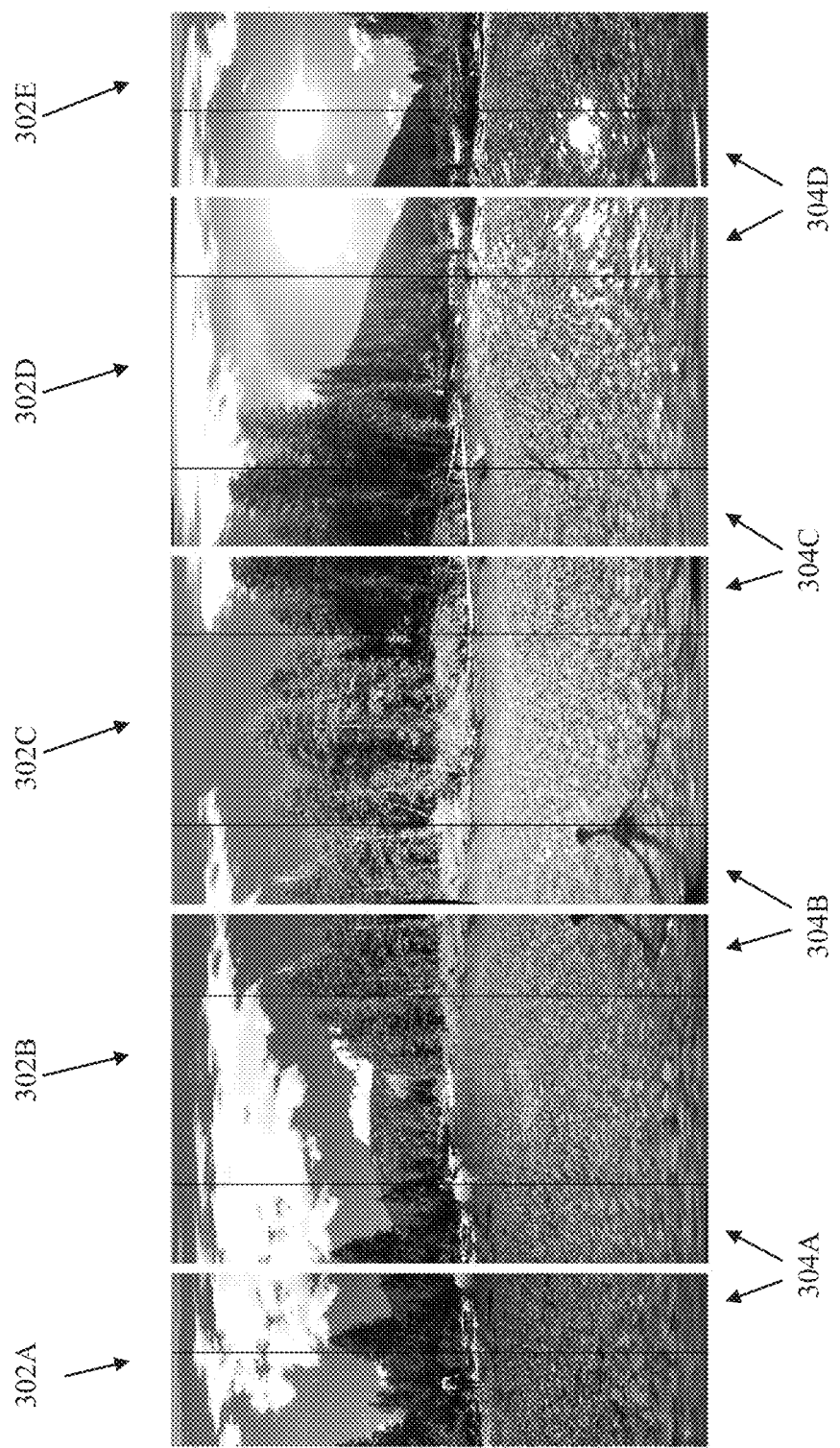
Figure 3C:

Reference is now made to FIGS. 3A-3C, which are exemplary images depicting processing of correcting digital images to smooth out differences in different white balance and/or exposure settings, in accordance with some embodiments of the present invention.

FIG. 3A includes raw digital images 302A-E of a scene captured by one or more cameras. Each image 302A-E has different white balance and/or exposure settings.

FIG. 3B includes overlapping regions 304A-D of digital images 302A-E. Each images 302B-D overlaps with two other images. For example, image 302B overlaps with image 302A at 304A, and overlaps with image 302C at 304B. The overlapping regions are used to compute the correcting gamma values that are applied to correct the non-reference digital images, as described herein. For example, the gamma parameters that are computed and applied to each channel of image 302B are computed according to a correlation with gamma corrected parameters of image 302A at overlap region 304A, and with a correlation with gamma corrected parameters of image 302C at overlap region 304B.

FIG. 3C includes a panoramic image 306 that is created by stitching the color corrected digital images.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant panoramic images will be developed and the scope of the term panoramic image is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of processing digital images for creation of a digital panoramic image, comprising:
receiving a plurality of overlapping digital images captured for creating a digital panoramic image; selecting from the plurality of overlapping digital images a reference digital image such that the selected reference digital image has the most uniform distribution of pixel intensity values among plurality of overlapping digital images as having lowest variation in distribution of pixel intensity values, wherein gamma parameters of the channels of the reference digital image are set to a baseline value; performing for each certain overlapping image of the plurality of overlapping images that overlaps with at least one other image at a respective overlapping region: computing, according to said baseline value, a value for each respective gamma parameter for each channel of the certain overlapping image to obtain a correlation between pixel intensity values, corrected with the respective gamma parameters, of each channel of each overlapping region of the certain overlapping image, and pixel intensity values, corrected with respective gamma parameters, computed for each of the at least one other image, for each channel of each respective overlapping region; and creating corrected images with smoother color extremes by applying the computed value of each respective gamma parameter to the overlapping and non-overlapping regions of each certain overlapping image of the plurality of overlapping images, wherein pixels of channels of the at least one overlapping region of each non-reference overlapping digital image having maximum or minimum intensity values are excluded from the computation of the values of the gamma parameter.

2. The method of claim 1, wherein the values of the respective gamma parameters for each channel of each certain overlapping image of the plurality of overlapping images are computed simultaneously.

3. The method according to claim 1, wherein the correlation defines a statistically significant match between an average value of the gamma corrected pixel intensity values computed for each channel of each overlapping region of the certain overlapping image and an average value of the gamma corrected pixel intensity values of each channel of each of the at least one overlapping images at respective overlapping regions.

4. The method according to claim 1, wherein pixels of channels of the non-overlapping region of each non-reference digital image having maximum or minimum intensity values are excluded from correction using the computed value of the gamma parameter.

5. The method of claim 1, further comprising:
receiving a first and second set of stereoscopic pairs of overlapping images; and
processing the first and second set of stereoscopic pairs of overlapping images to create the plurality of overlapping digital images by interleaving corresponding images of the first and second set of stereoscopic pairs of overlapping images.

6. The method according to claim 1, wherein at least one of the plurality of digital images includes a significant region of at least one of over-exposure pixel intensity values and under-exposure pixel intensity values that create visually apparent differences between colors when the plurality of non-gamma corrected non-reference digital images and the reference digital image are stitched to create the digital panoramic image.

7. The method according to claim 1, wherein each digital image of the plurality of received digital images is captured with a different camera setting of at least one of: auto exposure and white balance.

8. The method according to claim 1, wherein the distribution of pixel intensity values of each respective digital image is computed as a sum of differences between a frequency of each intensity value of the pixels of the respective digital image and a weighted average intensity value of the pixels of the respective digital image.

9. The method according to claim 1, wherein the value of the gamma parameter computed for each channel of the reference digital image is set to the reference value of one, and the value of the gamma parameters computed for each channel of the non-reference digital images are computed based on the reference value of one set for the gamma parameters of the reference digital image.

10. The method according to claim 1, wherein the values of the gamma parameter applied to pixel intensity values of each channel of each non-reference digital image are computed based on said baseline value, according to the following relationship:

$$\sum_{i=1}^{n} \|\gamma_i * B_i - \gamma_{(i+1) \bmod n} * B_{(i+1) \bmod 8}\|$$

wherein:
$\gamma_i$ denotes the value of the gamma parameter of digital image i,
n denotes the number of digital images,
i=x denotes the reference digital image and $\gamma_x$ is set to the value 1, $$B_i = \ln\left(\frac{\sum_p I_i(p)}{NI_i}\right),$$

$NI_i$ denotes the number of pixels in the overlap region between non-reference digital images $I_x$ and $I_{x \bmod n}$, and
$I_i(p)$ denotes the intensity value of pixel p of digital image i.

11. The method according to claim 10, wherein for color digital images with three color channels an optimal solution computed for 8 equations and 7 unknown values denoted by the relationship is computed based on a Linear Least Square method.

12. The method according to claim 1, further comprising:
identifying at least one over/under exposure region of the non-overlapping region of each respective non-reference digital image according to a requirement of at least one of over-exposed and under-exposed intensity values of pixels of channels of the non-overlapping region of the respective non-reference digital image; and
applying the computed value of the gamma parameter to each pixel intensity value of each channel of the over/under exposure region by a relatively greater adjustment of the value of the gamma parameter for pixel intensity values closer to the over-exposure and under-exposure values relative to pixel intensity values closer to middle-exposure values.

13. The method according to claim 12, wherein the value of the gamma parameter is applied to each pixel intensity value of each channel of the over/under exposure region according the following relationships:

$$I_i(p)=F(i,p,\gamma)$$

$$F(i,p,\gamma)=I_i(p)-f(I_i(p)-I_i(p)^\gamma)$$

wherein:
γ denotes the value of the gamma parameter,
p denotes the respective pixel being corrected,
$I_i(p)$ denotes the intensity value of pixel p of digital image i, and
f denotes a gamma factor that performs a smooth change of the value of the gamma parameter.

14. The method according to claim 13, wherein when the pixel intensity values are defined by the range [0,255], and wherein $f=-0.0000615148019992*I_i(p)^2+0.0156862745098*I_i(p)$.

15. The method according to claim 12, wherein the requirement defines the over/under exposure region as including at least one pixel having maximum or minimum intensity values and a neighborhood of proximal pixels having intensity values below the maximum intensity value and above the minimum intensity value.

16. The method of claim 1, wherein each digital image is a color digital image defined by red, green, and blue channels, wherein a respective value of the gamma parameter is computed for each red, green, and blue channel of each digital image.

17. The method of claim 1, further comprising stitching the plurality of corrected non-reference digital images and the reference digital image to create the digital panoramic image.

18. The method of claim 1, wherein the received plurality of digital images capture a 360×180 field of view, and wherein at least one of the plurality of digital images overlaps with four other digital images.

19. A system for processing digital images for creation of a digital panoramic image, comprising: a non-transitory memory having stored thereon a code for execution by at least one hardware processor of a computing device, the code comprising: code for receiving a plurality of overlapping digital images captured for creating a digital panoramic image; code for selecting from the plurality of overlapping digital images a reference digital image such that the selected reference digital image has the most uniform distribution of pixel intensity values among plurality of overlapping digital images as having lowest variation in distribution of pixel intensity values, wherein gamma parameters of the channels of the reference digital image are set to a baseline value; code for performing for each certain overlapping image of the plurality of overlapping images that overlaps with at least one other image at a respective overlapping region: computing, according to said baseline value, a value for each respective gamma parameter for each channel of the certain overlapping image to obtain a correlation between pixel intensity values, corrected with the respective gamma parameters, of each channel of each overlapping region of the certain overlapping image, and pixel intensity values, corrected with respective gamma parameters, computed for each of the at least one other image, for each channel of each respective overlapping region; and code for creating corrected images with smoother color extremes by applying the computed value of each respective gamma parameter to the overlapping and non-overlapping regions of each certain overlapping image of the plurality of overlapping images, wherein pixels of channels of the at least one overlapping region of each non-reference overlapping digital image having maximum or minimum intensity values are excluded from the computation of the values of the gamma parameter.

20. A computer program product for processing digital images for creation of a digital panoramic image, comprising: a non-transitory memory having stored thereon a code for execution by at least one hardware processor of a computing device, the code comprising: instructions for receiving a plurality of overlapping digital images captured for creating a digital panoramic image; instructions for selecting from the plurality of overlapping digital images a reference digital image such that the selected reference digital image has the most uniform distribution of pixel intensity values among plurality of overlapping digital images as having lowest variation in distribution of pixel intensity values, wherein gamma parameters of the channels of the reference digital image are set to a baseline value; instructions for performing for each certain overlapping image of the plurality of overlapping images that overlaps with at least one other image at a respective overlapping region: computing, according to said baseline value, a value for each respective gamma parameter for each channel of the certain overlapping image to obtain a correlation between pixel intensity values, corrected with the respective gamma parameters, of each channel of each overlapping region of the certain overlapping image, and pixel intensity values, corrected with respective gamma parameters, computed for each of the at least one other image, for each channel of each respective overlapping region; and instructions for creating corrected images with smoother color extremes by applying the computed value of each respective gamma parameter to the overlapping and non-overlapping regions of each certain overlapping image of the plurality of overlapping images, wherein pixels of channels of the at least one overlapping region of each non-reference overlapping digital image having maximum or minimum intensity values are excluded from the computation of the values of the gamma parameter.

* * * * *